United States Patent
Bian et al.

(10) Patent No.: US 12,129,829 B2
(45) Date of Patent: Oct. 29, 2024

(54) CONTROL METHOD AND CONTROL DEVICE FOR WIND TURBINE

(71) Applicant: GOLDWIND SCIENCE & TECHNOLOGY CO., LTD., Xinjiang (CN)

(72) Inventors: Fengjiao Bian, Beijing (CN); Yousheng Yang, Beijing (CN); Lei Liu, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 18/549,500

(22) PCT Filed: Sep. 22, 2021

(86) PCT No.: PCT/CN2021/119597
§ 371 (c)(1),
(2) Date: Sep. 7, 2023

(87) PCT Pub. No.: WO2022/188392
PCT Pub. Date: Sep. 15, 2022

(65) Prior Publication Data
US 2024/0151209 A1    May 9, 2024

(30) Foreign Application Priority Data

Mar. 8, 2021 (CN) .......................... 202110249704.2

(51) Int. Cl.
*F03D 7/04* (2006.01)
*F03D 7/02* (2006.01)

(52) U.S. Cl.
CPC ........... *F03D 7/045* (2013.01); *F03D 7/0224* (2013.01); *F03D 7/0276* (2013.01); *F05B 2260/84* (2013.01); *F05B 2270/321* (2013.01)

(58) Field of Classification Search
CPC ...... F03D 7/045; F03D 7/0276; F03D 7/0224; F05B 2270/321
See application file for complete search history.

(56) References Cited

U.S. PATENT DOCUMENTS 10,451,035 B2   10/2019 Zinnecker et al.
2015/0176569 A1   6/2015 Karikomi et al.
(Continued)

FOREIGN PATENT DOCUMENTS

CN    102251926 A    11/2011
CN    102305179 A    1/2012
(Continued)

OTHER PUBLICATIONS

Song, English Translation of CN 103061980 A, 2013 (Year: 2013).*
(Continued)

*Primary Examiner* — Michael L Sehn (57) ABSTRACT

The present application provides a control method and a control device (710) for a wind turbine (720). The control method includes: acquiring incoming wind information of the wind turbine (720); determining whether there is a sector with a complex wind condition around the wind turbine (720) based on the acquired incoming wind information; in response to determining that there is a sector with a complex wind condition around the wind turbine (720), performing feed-forward load reduction control on the wind turbine (720) based on the complex wind condition.

20 Claims, 4 Drawing Sheets

(56) References Cited

U.S. PATENT DOCUMENTS

| | | |
|---|---|---|
| 2015/0267686 A1 | 9/2015 | Kjaer et al. |
| 2017/0167470 A1 | 6/2017 | Markham et al. |
| 2020/0263660 A1 | 8/2020 | De Boer |

FOREIGN PATENT DOCUMENTS

| | | |
|---|---|---|
| CN | 202250608 U | 5/2012 |
| CN | 102762852 A | 10/2012 |
| CN | 103061980 A | 4/2013 |
| CN | 103502637 A | 1/2014 |
| CN | 104005909 A | 8/2014 |
| CN | 104699936 A | 6/2015 |
| CN | 105654239 A | 6/2016 |
| CN | 105673324 A | 6/2016 |
| CN | 109416021 A | 3/2019 |
| CN | 109958574 A | 7/2019 |
| CN | 110094297 A | 8/2019 |
| CN | 110206685 A | 9/2019 |
| CN | 109441721 B | 1/2020 |
| CN | 111075649 A | 4/2020 |
| CN | 111310341 A | 6/2020 |
| CN | 111396249 A | 7/2020 |
| CN | 111441917 A | 7/2020 |
| CN | 109472314 B | 9/2020 |
| CN | 111749845 A | 10/2020 |
| CN | 112012882 A | 12/2020 |
| CN | 113309663 A | 8/2021 |
| EP | 1 770 278 A2 | 4/2007 |
| EP | 2 249 029 A2 | 11/2010 |
| EP | 2 607 689 A2 | 6/2013 |
| JP | 2018017198 A | 2/2018 |
| JP | 2019078223 A | 5/2019 |
| WO | 2015/192853 A1 | 12/2015 |
| WO | 2016/008500 A1 | 1/2016 |

OTHER PUBLICATIONS

Notification to Grant Patent issued by Chinese Patent Office dated Oct. 21, 2022; Appln. No. 202110249704.2.

First Chinese Office Action dated Apr. 21, 2022; Appln. No. 202110249704.2.

Donglin Cui, et al; "Analysis Method and Influence Discussion of Local Turbulence in Wind Farm", Acta Energiae Solaris Sinica; vol. 38, No. 9, Sep. 2017, 8 pages.

The International Search Report mailed Oct. 29, 2021; PCT/CN2021/119597.

Zao Li, et al; "Optimization Analysis of Sector Management in Brave Point Wind Farm", Wind Farm, China Academic Journal Electronic Publishing House, Mar. 2015; 5 pages.

Lin Shu, et al; "Design of Wind Speed Feedforward Control Algorithm Based on Laser Lidar", Dongfang Turbine; No. 2, Jun. 2017; 6 pages.

Xiaoguang Lu, et al; "Research on Gust Control System Based on Laser Wind Measurement", Machinery Electronics, vol. 34, No. 11, Nov. 2016, 5 pages.

Jiao Yang, et al., "Dual-PI Closed Loop Dynamic Decoupling Strategies for Large Wind Turbines", Journal of North University of China (Natural Science edition); vol. 34, No. 6, 2013; (Sum. No. 152), 7 pages.

The extended European search report dated Aug. 19, 2024; Appln 21929857.7.

* cited by examiner

CONTROL METHOD AND CONTROL DEVICE FOR WIND TURBINE

This application is a National Stage of International Application No. PCT/CN2021/119597, filed Sep. 22, 2021, which claims priority to and the benefit of Chinese Patent Application No. 202110249704.2, filed Mar. 8, 2021, the entireties of which are hereby incorporated herein by reference.

TECHNICAL FIELD

The present application relates to the technical field of wind power generation, and in particular to a control method and a control device for a wind turbine.

BACKGROUND

With the continuous development of high-quality wind areas with rich wind energy resources and open terrain, people began to deploy wind farms in mountainous areas with complex terrain. However, in these areas, the terrain has large undulations and changes, the distribution of wind energy resources is uneven, the climate conditions are relatively complex, the vegetation is abundant, and the wind conditions are highly variable, which makes the application environment of wind turbines extremely complicated. In practical applications, the complex wind conditions caused by complex terrain often exceed the standards and limit ranges considered in the design of wind turbines, which brings great harm to the strength, life and power generation performance of wind turbines.

In related technologies, wind turbine control strategies provided for these complex wind conditions have poor adaptability, and wind turbine failures occur frequently, making it difficult to achieve refined energy optimization management and optimal power generation under the premise of ensuring wind turbine safety.

SUMMARY

The purpose of the present application is to provide a control method and a control device for a wind turbine.

According to one aspect of the present application, there is provided a control method for a wind turbine, and the control method includes: acquiring incoming wind information of the wind turbine; determining whether there is a sector with a complex wind condition around the wind turbine based on the acquired incoming wind information; and in response to determining that there is a sector with a complex wind condition around the wind turbine, performing feed-forward load reduction control on the wind turbine based on the complex wind condition.

According to another aspect of the present application, there is provided a control device for a wind turbine, and the control device includes: a wind condition prediction unit configured to: acquire incoming wind information of the wind turbine; a sector identification unit configured to: determine whether there is a sector with a complex wind condition around the wind turbine based on the acquired incoming wind information; and a load reduction control unit configured to: in response to determining that there is a sector with a complex wind condition around the wind turbine, perform feed-forward load reduction control on the wind turbine based on the complex wind condition.

According to another aspect of the present application, there is provided a computer-readable storage medium having stored thereon computer programs that, when executed by a processor, implement the control method for a wind turbine as described previously.

According to another aspect of the present application, there is provided a computer device, and the computer device includes: a processor; and a memory storing computer programs that, when executed by the processor, implement the control method for a wind turbine as described previously.

BRIEF DESCRIPTION OF THE DRAWINGS

Through the following description in conjunction with the accompanying drawings, the above-mentioned purpose and characteristics of the present application will become more clear, wherein.

DETAILED DESCRIPTION

The idea of the present application is that: a wind turbine will bear a load caused by various complex wind conditions (such as an excessive turbulence intensity, a sudden change of a wind speed, a sudden change of a wind direction, etc.) while capturing wind energy, since loads caused by different complex wind conditions are also different, different feed-forward load reduction strategies can be performed on the running wind turbine for different complex wind conditions before the complex wind conditions reach the wind turbine, to ensure that the wind turbine can also operate safely and stably in complex terrain areas, and ensure the overall power generation of the wind turbine to the greatest extent.

Hereinafter, embodiments of the present application will be described in detail with reference to the drawings.

Figure 1:
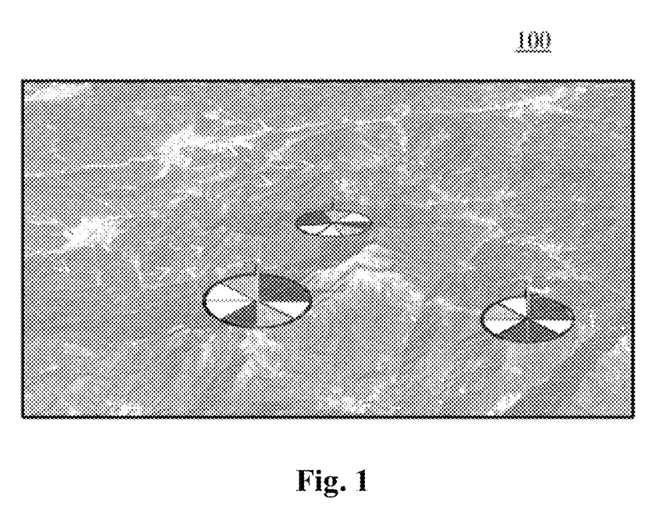
FIG. 1 shows a schematic diagram of a sector-based wind condition distribution for a wind turbine according to an exemplary embodiment of the present application.

FIG. 1 shows a schematic diagram 100 of a sector-based wind condition distribution for a wind turbine according to an exemplary embodiment of the present application.

Referring to FIG. 1, it can be seen that when the wind turbine operates under complex terrain conditions, there is a large difference in a terrain of each sector of the wind turbine, resulting in a large difference in a wind condition in each sector of the wind turbine, wherein the darkest sectors are those with complex wind conditions. For sectors with complex wind conditions, corresponding effective load reduction control strategies should be adopted to ensure that the wind turbine can operate safely and stably under complex wind conditions, and to ensure the overall power generation of each wind turbine to the greatest extent, while reducing the cost of on-site maintenance and increasing the overall return on investment of the project.

Figure 2:
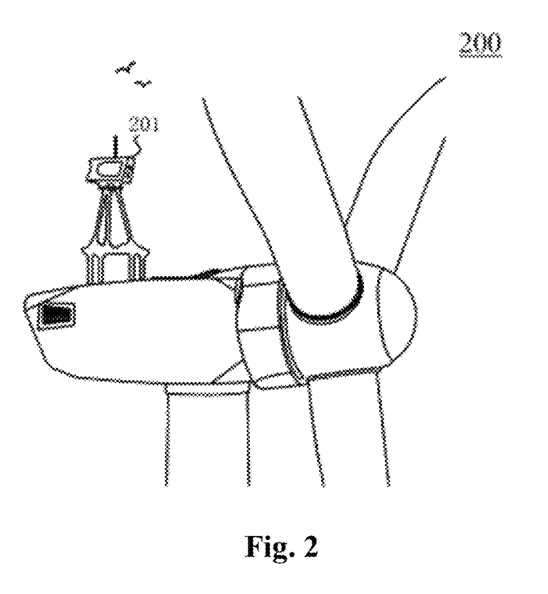
FIG. 2 shows a schematic diagram of a laser radar wind measurement system for a wind turbine according to an exemplary embodiment of the present application.

FIG. 2 shows a schematic diagram 200 of a laser radar wind measurement system for a wind turbine according to an exemplary embodiment of the present application.

Referring to FIG. 2, a laser radar wind measurement system 201 for a wind turbine according to an exemplary embodiment of the present application may be arranged on the top of a nacelle of the wind turbine, and incoming wind information in front of the wind turbine (including, but not limited to, information such as a wind speed, a wind direction, a turbulence and the like) can be accurately measured through the laser radar wind measurement system. On this basis, a characteristic wind condition recognition algorithm may be used to capture complex wind conditions in advance, so that the wind turbine can respond positively, thereby effectively reducing a negative impact of various complex wind conditions on the wind turbine and further improving the safety and stability of the wind turbine.

Figure 3:
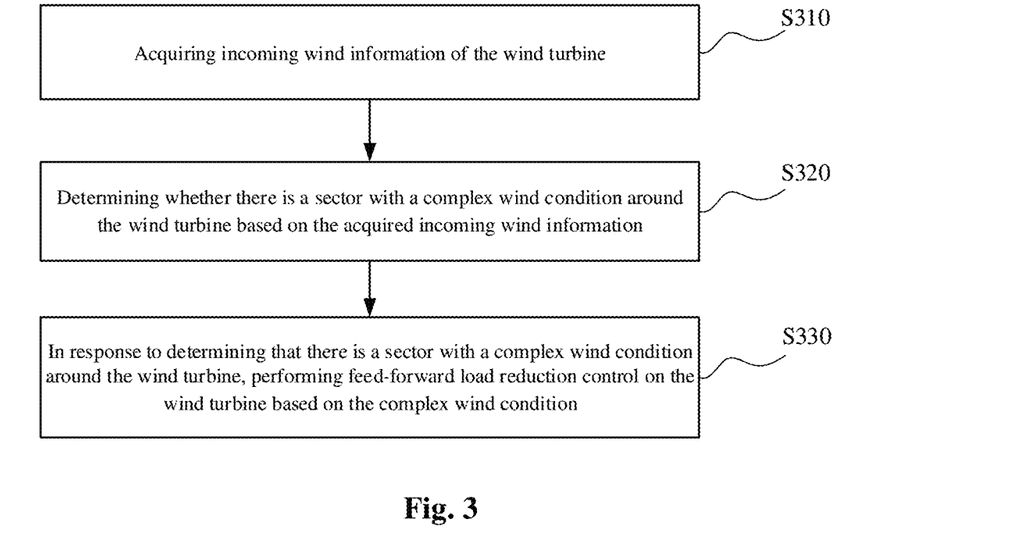
FIG. 3 shows a flow chart of a control method for a wind turbine according to an exemplary embodiment of the present application.

FIG. 3 shows a flowchart 300 of a control method for a wind turbine according to an exemplary embodiment of the present application.

Referring to FIG. 3, the control method shown in FIG. 3 may include the following steps.

At step 310, incoming wind information of the wind turbine may be acquired.

In one example, forward wind condition information around the wind turbine may be detected through a laser radar wind measurement system (as shown in FIG. 2), and the incoming wind information of the wind turbine may be derived from the detected forward wind condition information. The incoming wind information may include, but is not limited to, various wind parameter information such as wind speed and direction, wind speed status and the like. In this way, the incoming wind information of the wind turbine in all directions can be predicted before the incoming wind blows to a rotor of the wind turbine, so as to provide accurate and reliable data basis for the subsequent feed-forward load reduction control.

It should be understood that although an example of acquiring incoming wind information through a laser radar wind measurement system is described above, this example is only exemplary, and the present application is not limited thereto. For example, the incoming wind information may also be acquired from weather forecasts or other remote sensing wind measurement devices.

At step 320, whether there is a sector with a complex wind condition around the wind turbine may be determined based on the acquired incoming wind information.

In one example, it may be determined whether a load borne by the wind turbine due to incoming wind exceeds a set threshold. In response to determining that the load exceeds the set threshold, it may be determined whether a value of a wind condition characteristic of the incoming wind when the wind turbine is bearing the load exceeds a characteristic threshold. In response to determining that the value of the wind condition characteristic exceeds the characteristic threshold, a wind condition of the incoming wind may be identified as a complex wind condition. It may be determined whether there is a sector with a complex wind condition around the wind turbine based on an inflow direction of the complex wind condition. As a feasible implementation, a value of a wind condition characteristic of the incoming wind when the wind turbine is bearing a maximum value of the load may be selected as the value of the wind condition characteristic of the incoming wind. For example, when using a nacelle acceleration or a relevant position load of the wind turbine to characterize the load borne by the wind turbine due to incoming wind, a value of a wind condition characteristic corresponding to an apex moment of an envelope of the nacelle acceleration or the relevant position load may be selected as the value of the wind condition characteristic of the incoming wind. However, the present application is not limited thereto, for example, a value of a wind condition characteristic corresponding to a mean moment of the wind turbine during bearing the load may also be selected as the value of the wind condition characteristic of the incoming wind.

Herein, the wind condition characteristic may include, but is not limited to, one or a combination of the following characteristics: a turbulence intensity of the incoming wind during a duration period, a change rate of a wind speed of the incoming wind during the duration period, a wind direction twist angle of the incoming wind during the duration period, a wind shear factor of the incoming wind during the duration period, a wind direction change rate of the incoming wind during the duration period, and a wind direction fluctuation amplitude of the incoming wind during the duration period.

It should be understood that the above wind condition characteristics are only exemplary, and the present application is not limited thereto, and other wind condition characteristics, such as leeward and the like, may also be used as required.

Additionally, in this example, under a condition that a plurality of wind condition characteristics of the incoming wind exceed corresponding characteristic thresholds, a correlation coefficient between each of the plurality of wind condition characteristics and the load (i.e., an influence weight of each wind condition characteristic on the load) may be determined, and a wind condition characteristic with a correlation coefficient greater than a predetermined threshold among the plurality of wind condition characteristics is identified as a complex wind condition (that is, several wind characteristics with relatively large correlation coefficients among the plurality of wind condition characteristics are identified as complex wind conditions). In addition, a wind condition characteristic with the largest correlation coefficient among the plurality of wind condition characteristics may be identified as a complex wind condition. In this regard, the present application is not limited.

Under these complex wind conditions, the wind turbine is prone to various failures, such as problems of increased nacelle acceleration, wind turbine overspeed, blade sweeping and so on.

After identifying complex wind conditions, the wind turbine may be split into several sectors along a surrounding 3600 direction (as shown in FIG. 1), and then it may be determined whether there is a sector with a complex wind condition around the wind turbine based on an inflow direction of the complex wind condition.

Below, a portion of the above complex wind conditions will be specifically described with reference to FIG. 4 and FIG. 5.

Figure 4:
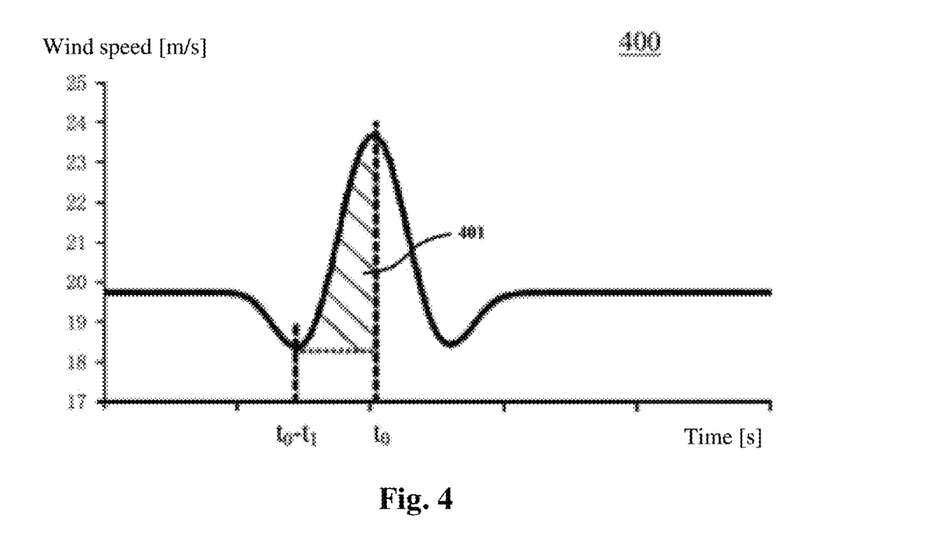
FIG. 4 shows a schematic diagram of a change rate of a wind speed of incoming wind during a duration period according to an exemplary embodiment of the present application.

FIG. 4 shows a schematic diagram 400 of a change rate of a wind speed of incoming wind during a duration period according to an exemplary embodiment of the present application.

Referring to FIG. 4, a change rate of a wind speed of the incoming wind during a duration period from $t_0$-$t_1$ to $t_0$ (i.e., a change amount of a sudden change in wind speed) may be characterized by an integral area 401 between a minimum value and a maximum value of the wind speed during the duration period from $t_0$-$t_1$ to $t_0$ as shown in FIG. 4. Under a condition that the integral area 401 exceeds a threshold, the sudden change in wind speed shown in FIG. 4 may be regarded as a complex wind condition.

Figure 5:
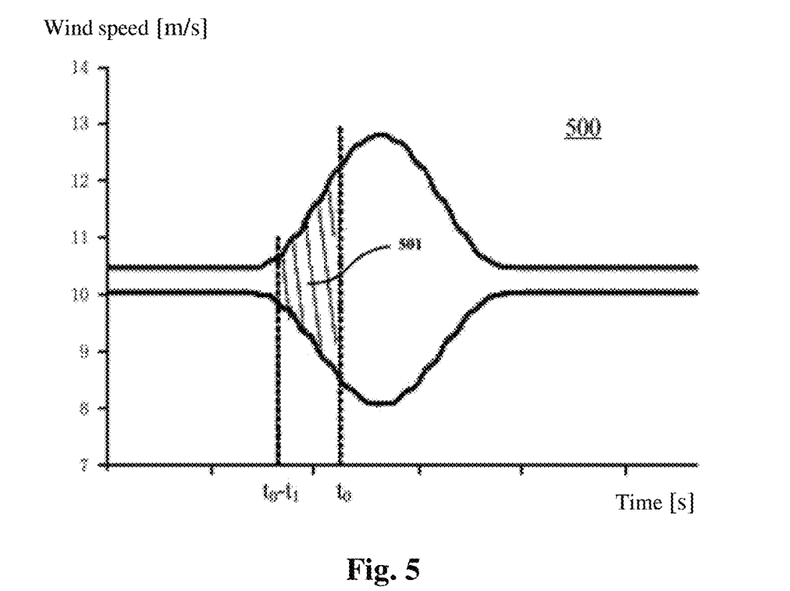
FIG. 5 shows a schematic diagram of a wind shear factor of incoming wind during a duration period according to an exemplary embodiment of the present application.

FIG. 5 shows a schematic diagram 500 of a wind shear factor of incoming wind during a duration period according to an exemplary embodiment of the present application.

Referring to FIG. 5, a wind shear factor of incoming wind during a duration period from $t_0$-$t_1$ to $t_0$ may be characterized by an integral area 501 between two fitted contour lines of wind speed of different heights (i.e., a change amount of a sudden change in wind shear) during the duration period from $t_0$-$t_1$ to $t_0$ as shown in FIG. 5. Under a condition that the integral area 501 exceeds a threshold (or is negative), the sudden change in wind shear shown in FIG. 5 may be regarded as a complex wind condition.

Although not shown in the figures, a turbulence intensity of the incoming wind during a duration period may be characterized by a ratio of a wind speed standard deviation to a wind speed mean value during the duration period (i.e., a change amount of a sudden change in turbulence intensity). Under a condition that the ratio exceeds a threshold, the sudden change in turbulence intensity may be regarded as a complex wind condition.

Although not shown in the figures, a wind direction twist angle of the incoming wind in the duration period can be characterized by an extreme value difference or standard deviation between a maximum value and a minimum value of wind direction time series during the duration period (i.e., a change amount of a sudden change in wind direction). Under a condition that the extreme value difference or standard deviation exceeds a threshold, the sudden change in wind direction may be regarded as a complex wind condition.

Returning again to FIG. 3, at step 330, in response to determining that there is a sector with a complex wind condition around the wind turbine, feed-forward load reduction control may be performed on the wind turbine based on the complex wind condition.

Herein, the feed-forward load reduction control may include, but is not limited to, one or a combination of the following operations: increasing a pitch angle of the wind turbine, increasing a pitch speed of the wind turbine, reducing a turbine speed of the wind turbine and reducing a turbine torque of the wind turbine. These load reduction control operations can effectively reduce the increased wind turbine load due to the above-mentioned complex wind conditions.

It should be understood that the above feed-forward load reduction operation manner is only exemplary, and the present application is not limited thereto, and other feed-forward load reduction operation manners may also be adopted as required.

In one example, it may be determined whether there is a response parameter (for example, but is not limited to, a control parameter such as a pitch angle, a pitch speed, a turbine speed, a turbine torque, and so on) of a complex wind condition matching the complex wind condition in a wind condition load reduction model, wherein the wind condition load reduction model includes an optimal load reduction control strategy set for a response parameter of each complex wind condition; in response to determining that there is a response parameter of a complex wind condition matching the complex wind condition in the wind condition load reduction model, an optimal load reduction control strategy set for a response parameter of the matched complex wind condition may be acquired from the wind condition load reduction model; and feed-forward load reduction control on the wind turbine may be performed based on the acquired optimal load reduction control strategy. As a feasible implementation, the optimal load reduction control strategy set for a response parameter of each complex wind condition included in the wind condition load reduction model may be defined according to historical load reduction operation data, or may also be obtained by using neural network training to train the historical load reduction operation data and data of each load reduction operation of the wind turbine. The wind condition load reduction model constructed by means of neural network training can make the load reduction control of the wind turbine more precise and intelligent, thereby effectively reducing wind turbine failures and shutdown caused by various complex wind conditions (even extreme wind conditions), reducing the resulting loss of power generation, and improving the adaptability of the wind turbine to the natural environment (especially complex terrain).

In this example, an enhanced dynamic fuzzy neural network model may be used, and its implementation process is as follows.

At step I, a fuzzy set may be confirmed. The concept of the fuzzy set is extended on the basis of a general set, and the fuzzy set is also composed of some elements, but these elements are described by fuzzy language. Wind condition complexity may be described using three fuzzy language values: low, normal, high, for example, if letters are used to represent them as NS, ZO and PS respectively, the fuzzy set may be represented as T={NS, ZO, PS}.

At step II, a membership function (for example, a Gaussian membership function) may be confirmed. The membership function is to measure a membership degree of a certain quantity belonging to a certain fuzzy language value. An output value of the membership function may be in an interval [0, 1], and a degree of uncertainty may be transformed into a mathematical expression through the membership function.

At step III, a fuzzy rule may be confirmed. Herein, a TSK model may be used, whose output is an exact quantity and is determined by a linear combination of all inputs of the system (for example, information such as a radar wind direction, a radar wind speed, a turbulence intensity, a wind shear, a wind torsion, a pitch angle, an X-direction acceleration and a Y-direction acceleration, and so on), its coefficients are equivalent to different weight coefficients.

At step IV, a dynamic fuzzy neural network of an elliptic base may be used, specifically, an increase or decrease of a fuzzy rule may be determined by predicting a system deviation of a control signal and an actual signal and a mapping range of a Gaussian accommodating boundary, normalization processing may be performed through the elliptic base, and the fuzzy rule may be pruned by the least squares method that minimizes the system deviation.

At step V, an optimal load reduction control function may be output. Herein, the parameter (function) of the optimal load reduction control is a feed-forward pitch rate under complex wind conditions.

It should be understood that the enhanced dynamic fuzzy neural network model used above is only exemplary, and the present application is not limited thereto, and other enhanced neural network models or other different types of neural network models may also be used as required.

In addition, in this example, in response to determining that there is no response parameter of a complex wind condition matching the complex wind condition in the wind condition load reduction model, an upper limit of an output power of the wind turbine may also be limited. The power upper limit may be limited by a parameter, and may also be set as a power corrected according to different wind speeds. As a feasible implementation, the wind turbine may be controlled to perform the above-described feed-forward load reduction control operation based on the upper limit of the output power, for example, but not limited to, increasing the pitch angle of the wind turbine.

In addition, in this example, feed-forward load reduction control performed by limiting the upper limit of the output power of the wind turbine (also called power limiting operation) may be recorded, as an optimal load reduction control strategy set for a response parameter of the complex wind condition, in the wind condition load reduction model. For example, time series data before and after the feed-forward load reduction control performed by limiting the upper limit of the output power of the wind turbine may be used as a sample for learning the optimal load reduction control strategy in complex wind conditions, the accumulated samples are trained and learned by neural network, and are recorded into the wind condition load reduction model together with response parameters matching complex wind conditions. In this way, a corresponding optimal load reduction control strategy can be provided for the wind turbine or other wind turbines encountering the same or similar complex wind conditions in the future operation process. As a feasible implementation, an initial state of an optimal load reduction control parameter flag bit may be output as False by default (that is, the wind turbine has not acquired the parameter of the optimal load reduction control), and the response parameter of the complex wind condition before execution of power limiting operation are output to the wind condition load reduction model for training, and then the wind condition load reduction model is divided into a test set and a verification set according to a certain rule to select a multi-level neural network for training, and normalization processing is performed on hidden layer information to eliminate the problem of different scales between different information dimensions. Different weight values may be used for different information, and finally a deviation between a predicted control signal and an actual signal is taken as an optimization goal. The parameter of the optimal load reduction control may be acquired through training, and at this time, the optimal load reduction control parameter flag bit may be output as True to end the training.

Figure 6:
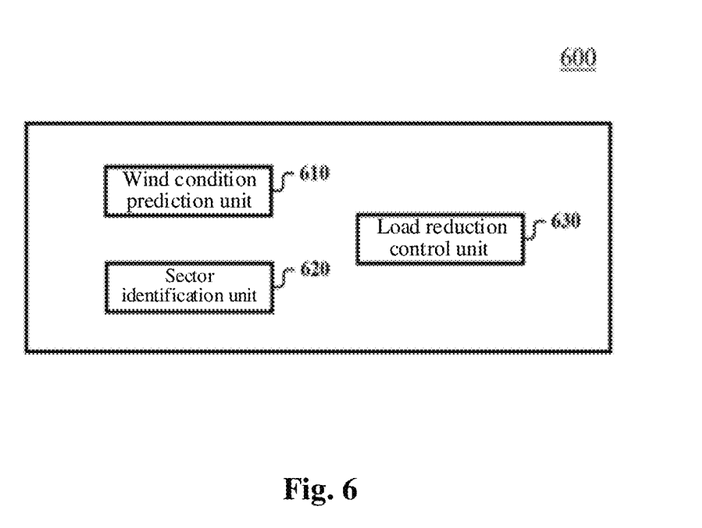
FIG. 6 shows a structural block diagram of a control device for a wind turbine according to an exemplary embodiment of the present application.

FIG. 6 shows a structural block diagram 600 of a control device for a wind turbine according to an exemplary embodiment of the present application.

Referring to FIG. 6, a control device for a wind turbine according to an exemplary embodiment of the present application may include a wind condition prediction unit 610, a sector identification unit 620, and a load reduction control unit 630, wherein the wind condition prediction unit 610 may be configured to acquire incoming wind information of the wind turbine; the sector identification unit 620 may be configured to determine whether there is a sector with a complex wind condition around the wind turbine based on the acquired incoming wind information; the load reduction control unit 630 may be configured to: in response to determining that there is a sector with a complex wind condition around the wind turbine, perform feed-forward load reduction control on the wind turbine based on the complex wind condition.

In the control device shown in FIG. 6, the wind condition prediction unit 610 may include a radar detection unit and a wind condition acquisition unit (both are not shown), wherein the radar detection unit may be configured to detect forward wind condition information around the wind turbine through a laser radar wind measurement system; the wind condition acquisition unit may be configured to derive the incoming wind information of the wind turbine from the detected forward wind condition information.

In the control device shown in FIG. 6, the sector identification unit 620 may include a load determination unit, a characteristic determination unit, a wind condition identification unit, and a sector identification unit (all of them are not shown), wherein the load determination unit may be configured to determine whether a load borne by the wind turbine due to incoming wind exceeds a set threshold; the characteristic determination unit may be configured to: in response to determining that the load exceeds the set threshold, determine whether a value of a wind condition characteristic of the incoming wind when the wind turbine is bearing the load exceeds a characteristic threshold; the wind condition identification unit may be configured to: in response to determining that the value of the wind condition characteristic exceeds the characteristic threshold, identify a wind condition of the incoming wind as a complex wind condition; the sector identification unit may be configured to determine whether there is a sector with a complex wind condition around the wind turbine based on an inflow direction of the complex wind condition.

In the control device shown in FIG. 6, the wind condition characteristic may include, but is not limited to at least one of the following characteristics: a turbulence intensity of the incoming wind during a duration period, a change rate of a wind speed of the incoming wind during the duration period, a wind direction twist angle of the incoming wind during the duration period, a wind shear factor of the incoming wind during the duration period, a wind direction change rate of the incoming wind during the duration period, and a wind direction fluctuation amplitude of the incoming wind during the duration period. Correspondingly, under a condition that a plurality of wind condition characteristics of the incoming wind exceed corresponding characteristic thresholds, the wind condition identification unit may also be configured to determine a correlation coefficient between each of the plurality of wind condition characteristics and the load (that is, an influence weight of each wind condition characteristic on the load), and identify a wind condition characteristic with a correlation coefficient greater than a predetermined threshold among the plurality of wind condition characteristics as a complex wind condition.

In the control device shown in FIG. 6, a wind condition selection unit (not shown) may also be included, and the wind condition selection unit may be configured to select a value of a wind condition characteristic of the incoming wind when the wind turbine is bearing a maximum value of the load as the value of the wind condition characteristic of the incoming wind when the wind turbine is bearing the load.

In the control device shown in FIG. 6, the load reduction control unit 630 may include a wind condition matching unit, a load reduction acquisition unit, and a first control unit (all of them are not shown), wherein the wind condition matching unit may be configured to determine whether there is a response parameter of a complex wind condition matching the complex wind condition in a wind condition load reduction model, wherein the wind condition load reduction model includes an optimal load reduction control strategy set for a response parameter of each complex wind condition of the wind turbine; the load reduction acquisition unit may be configured to: in response to determining that there is a response parameter of a complex wind condition matching the complex wind condition in the wind condition load reduction model, acquire an optimal load reduction control strategy set for a response parameter of the matched complex wind condition from the wind condition load reduction model; the first control unit may be configured to: perform feed-forward load reduction control on the wind turbine based on the acquired optimal load reduction control strategy.

In the control device shown in FIG. 6, the load reduction control unit 630 may further include a second control unit (not shown), and the second control unit may be configured to: in response to determining that there is no response parameter of a complex wind condition matching the complex wind condition in the wind condition load reduction model, limit an upper limit of an output power of the wind turbine.

In the control device shown in FIG. 6, a load reduction record unit (not shown) may also be included, and the load reduction record unit may be configured to: record feed-forward load reduction control performed by limiting the upper limit of the output power of the wind turbine, as an optimal load reduction control strategy set for a response parameter of the complex wind condition, in the wind condition load reduction model.

In the control device shown in FIG. 6, the feed-forward load reduction control may include, but is not limited to, the following operations: increasing a pitch angle of the wind turbine, increasing a pitch speed of the wind turbine, reducing a turbine speed of the wind turbine and reducing a turbine torque of the wind turbine.

Figure 7:
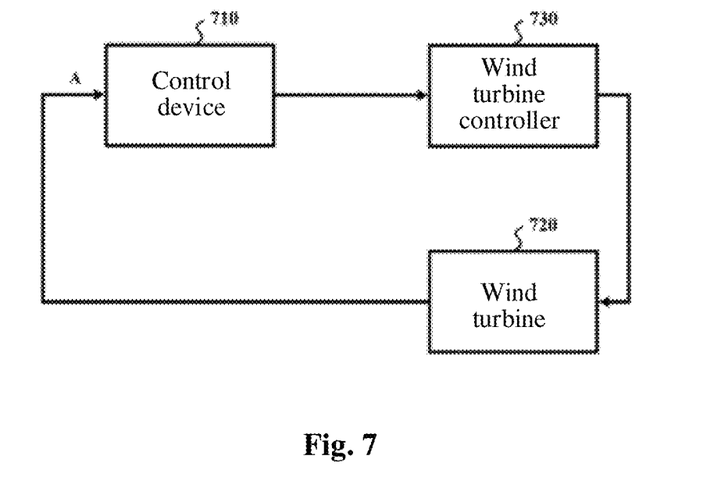
FIG. 7 shows a schematic diagram of a system architecture for a wind turbine according to an exemplary embodiment of the present application.

FIG. 7 shows a schematic diagram 700 of a system architecture for a wind turbine according to an exemplary embodiment of the present application.

Referring to FIG. 7, a system architecture for a wind turbine according to an exemplary embodiment of the present application may include a control device 710 shown in FIG. 6, a wind turbine 720 and a wind turbine controller 730 (such as, but not limited to, a main control PLC system or pitch control system in the wind turbine, etc.). The control method for a wind turbine according to an exemplary embodiment of the present application may be run as an algorithm in a calculation unit of the control device 710, and the control device 710 may include, but not limited to, the wind condition prediction unit 610, the sector identification unit 620 and the load reduction control unit 630 shown in FIG. 6.

In the system architecture shown in FIG. 7, the control device 710 may acquire the sensed incoming wind information A of the wind turbine from the laser radar wind measurement system arranged on the top of the nacelle of the wind turbine (as shown in FIG. 2), and then determine whether there is a sector with a complex wind condition around the wind turbine based on the acquired incoming wind information A, and in response to determining that there is a sector with a complex wind condition around the wind turbine, perform feed-forward load reduction control on the wind turbine based on the complex wind condition.

It should be understood that although FIG. 7 shows a system architecture for a wind turbine according to an exemplary embodiment of the present application, the present application is not limited thereto. For example, the control device 710 may also be disposed between the wind turbine controller 730 and the wind turbine 720. In addition, in addition to being integrated in a separate controller, the control device 710 may also be integrated in the wind turbine controller 730 or a background controller for scheduling the wind turbine in a wind farm or other control devices that can be connected to the wind turbine controller 730 or wind turbine 720. In this regard, the present application is not limited.

Figure 8:
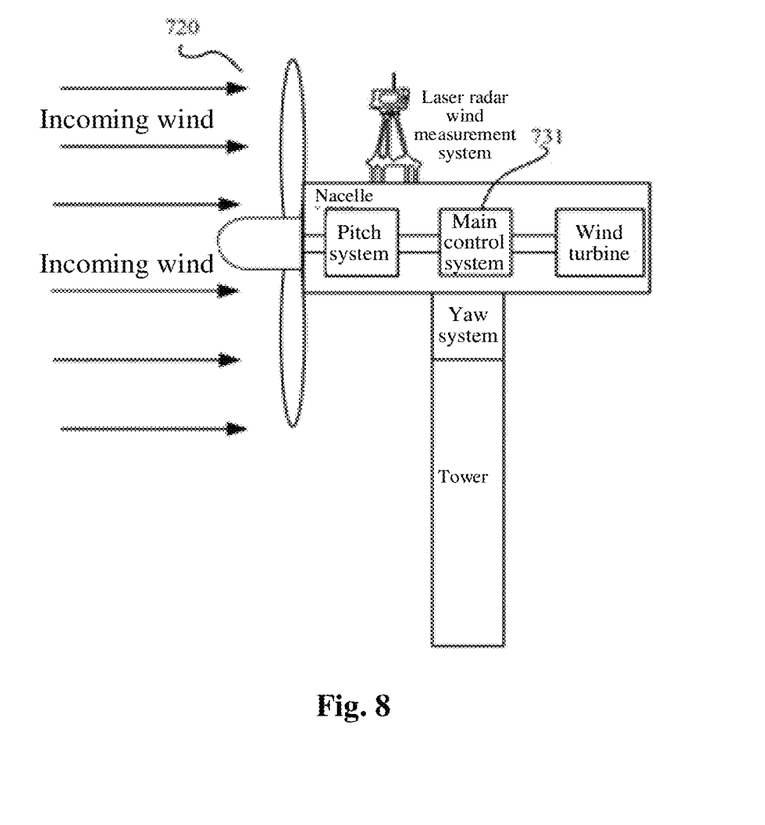
FIG. 8 shows a schematic diagram of a wind turbine according to an exemplary embodiment of the present application.

Exemplarily, as shown in FIG. 8, the control device 710 (not shown) is integrated in a main control PLC system 731 of the wind turbine, and the laser radar wind measurement system arranged on the top of the nacelle of the wind turbine may acquire the sensed incoming wind information of the wind turbine, and send the incoming wind information to the main control PLC system 731 of the wind turbine; the main control PLC system 731 of the wind turbine may determine whether there is a sector with a complex wind condition around the wind turbine 720 based on the incoming wind information, and in response to determining that there is a sector with a complex wind condition around the wind turbine 720, perform feed-forward load reduction control on the wind turbine based on the complex wind condition.

The control method and control device for a wind turbine according to the exemplary embodiments of the present application can enable the wind turbine to perform adaptive load reduction for various complex wind conditions without adding new investment (such as additional hardware equipment), thereby effectively reducing a wind turbine load caused by various complex wind conditions, improving the safety of the wind turbine and the adaptability of the wind turbine to the natural environment.

Exemplary embodiments according to the present application may also provide a computer-readable storage medium having stored thereon computer programs. The computer-readable storage medium stores computer programs that, when executed by a processor, causes the processor to execute the control method for a wind turbine according to the present application. A computer-readable recording medium is any data storage device that can store data read by a computer system. Examples of the computer-readable recording medium include: a read only memory, a random access memory, a read-only optical disk, a magnetic tape, a floppy disk, an optical data storage device, and a carrier wave (such as data transmission through the Internet via a wired or wireless transmission path).

Exemplary embodiments according to the present application may further provide a computer device. The computer device includes a processor and a memory. The memory is configured to store computer programs. The computer programs are executed by the processor so that the processor executes the computer programs for the control method for a wind turbine according to the present application.

Although the present application has been shown and described with reference to preferred embodiments, those skilled in the art should understand that without departing from the spirit and scope of the present application limited by the claims, these embodiments may be modified and transformed.

What is claimed is:

1. A control method for a wind turbine, wherein the control method comprises:
acquiring incoming wind information of the wind turbine;
determining, based on the acquired incoming wind information, whether there is a sector with a complex wind condition around the wind turbine based on a load borne by the wind turbine due to incoming wind;

in response to determining that there is a sector with a complex wind condition around the wind turbine, performing feed-forward load reduction control on the wind turbine based on the complex wind condition.

2. The control method according to claim 1, wherein the acquiring incoming wind information of the wind turbine comprises:

detecting forward wind condition information around the wind turbine through a laser radar wind measurement system;

deriving the incoming wind information of the wind turbine from the detected forward wind condition information.

3. The control method according to claim 1, wherein the determining whether there is a sector with a complex wind condition around the wind turbine comprises:

determining whether the load borne by the wind turbine due to incoming wind exceeds a set threshold;

in response to determining that the load exceeds the set threshold, determining whether a value of a wind condition characteristic of the incoming wind when the wind turbine is bearing the load exceeds a characteristic threshold;

in response to determining that the value of the wind condition characteristic exceeds the characteristic threshold, identifying a wind condition of the incoming wind as a complex wind condition;

determining whether there is a sector with a complex wind condition around the wind turbine based on an inflow direction of the complex wind condition.

4. The control method according to claim 3, wherein the wind condition characteristic comprises at least one of the following characteristics:

a turbulence intensity of the incoming wind during a duration period;

a change rate of a wind speed of the incoming wind during the duration period;

a wind direction twist angle of the incoming wind during the duration period;

a wind shear factor of the incoming wind during the duration period;

a wind direction change rate of the incoming wind during the duration period; and a wind direction fluctuation amplitude of the incoming wind during the duration period.

5. The control method according to claim 4, wherein under a condition that a plurality of wind condition characteristics of the incoming wind exceed corresponding characteristic thresholds, identifying a wind condition of the incoming wind as a complex wind condition comprises:

determining a correlation coefficient between each of the plurality of wind condition characteristics and the load;

identifying a wind condition characteristic with a correlation coefficient greater than a predetermined threshold among the plurality of wind condition characteristics as a complex wind condition.

6. The control method according to claim 3, further comprising:

selecting a value of a wind condition characteristic of the incoming wind when the wind turbine is bearing a maximum value of the load as the value of the wind condition characteristic of the incoming wind when the wind turbine is bearing the load.

7. The control method according to claim 1, wherein the performing feed-forward load reduction control on the wind turbine based on the complex wind condition comprises:

determining whether there is a response parameter of a complex wind condition matching the complex wind condition in a wind condition load reduction model, wherein the wind condition load reduction model comprises an optimal load reduction control strategy set for a response parameter of each complex wind condition;

in response to determining that there is a response parameter of a complex wind condition matching the complex wind condition in the wind condition load reduction model, acquiring an optimal load reduction control strategy set for a response parameter of the matched complex wind condition from the wind condition load reduction model;

performing feed-forward load reduction control on the wind turbine based on the acquired optimal load reduction control strategy.

8. The control method according to claim 7, wherein the performing feed-forward load reduction control on the wind turbine based on the complex wind condition further comprises:

in response to determining that there is no response parameter of a complex wind condition matching the complex wind condition in the wind condition load reduction model, limiting an upper limit of an output power of the wind turbine.

9. The control method according to claim 8, further comprising:

recording feed-forward load reduction control performed by limiting the upper limit of the output power of the wind turbine, as an optimal load reduction control strategy set for a response parameter of the complex wind condition, in the wind condition load reduction model.

10. The control method according to claim 1, wherein the load reduction control comprises at least one of the following operations:

increasing a pitch angle of the wind turbine;

increasing a pitch speed of the wind turbine;

reducing a turbine speed of the wind turbine; and reducing a turbine torque of the wind turbine.

11. A control device for a wind turbine, wherein the control device comprises:

a processor; and a memory for storing instructions executable by the processor;

wherein the processor is configured to:

acquire incoming wind information of the wind turbine;

determine, based on the acquired incoming wind information, whether there is a sector with a complex wind condition around the wind turbine based on a load borne by the wind turbine due to incoming wind;

in response to determining that there is a sector with a complex wind condition around the wind turbine, perform feed-forward load reduction control on the wind turbine based on the complex wind condition.

12. The control device according to claim 11, wherein the processor is further configured to:

detect forward wind condition information around the wind turbine through a laser radar wind measurement system;

derive the incoming wind information of the wind turbine from the detected forward wind condition information.

13. The control device according to claim 11, wherein the processor is further configured to:
- determine whether the load borne by the wind turbine due to incoming wind exceeds a set threshold;
- in response to determining that the load exceeds the set threshold, determine whether a value of a wind condition characteristic of the incoming wind when the wind turbine is bearing the load exceeds a characteristic threshold;
- in response to determining that the value of the wind condition characteristic exceeds the characteristic threshold, identify a wind condition of the incoming wind as a complex wind condition;
- determine whether there is a sector with a complex wind condition around the wind turbine based on an inflow direction of the complex wind condition.

14. The control device according to claim 13, wherein the wind condition characteristic comprises at least one of the following characteristics:
- a turbulence intensity of the incoming wind during a duration period;
- a change rate of a wind speed of the incoming wind during the duration period;
- a wind direction twist angle of the incoming wind during the duration period;
- a wind shear factor of the incoming wind during the duration period;
- a wind direction change rate of the incoming wind during the duration period; and
- a wind direction fluctuation amplitude of the incoming wind during the duration period.

15. The control device according to claim 14, wherein under a condition that a plurality of wind condition characteristics of the incoming wind exceed corresponding characteristic thresholds, the processor is further configured to:
- determine a correlation coefficient between each of the plurality of wind condition characteristics and the load;
- identify a wind condition characteristic with a correlation coefficient greater than a predetermined threshold among the plurality of wind condition characteristics as a complex wind condition.

16. The control device according to claim 13, wherein the processor is further configured to:
- select a value of a wind condition characteristic of the incoming wind when the wind turbine is bearing a maximum value of the load as the value of the wind condition characteristic of the incoming wind when the wind turbine is bearing the load.

17. The control device according to claim 11, wherein the processor is further configured to:
- determine whether there is a response parameter of a complex wind condition matching the complex wind condition in a wind condition load reduction model, wherein the wind condition load reduction model comprises an optimal load reduction control strategy set for a response parameter of each complex wind condition;
- in response to determining that there is a response parameter of a complex wind condition matching the complex wind condition in the wind condition load reduction model, acquire an optimal load reduction control strategy set for a response parameter of the matched complex wind condition from the wind condition load reduction model;
- perform feed-forward load reduction control on the wind turbine based on the acquired optimal load reduction control strategy.

18. The control device according to claim 17, wherein the processor is further configured to:
- in response to determining that there is no response parameter of a complex wind condition matching the complex wind condition in the wind condition load reduction model, limit an upper limit of an output power of the wind turbine.

19. The control device according to claim 18, wherein the processor is further configured to:
- record feed-forward load reduction control performed by limiting the upper limit of the output power of the wind turbine, as an optimal load reduction control strategy set for a response parameter of the complex wind condition, in the wind condition load reduction model.

20. The control device according to claim 11, wherein the load reduction control comprises at least one of the following operations:
- increasing a pitch angle of the wind turbine;
- increasing a pitch speed of the wind turbine;
- reducing a turbine speed of the wind turbine; and
- reducing a turbine torque of the wind turbine.

* * * * *